Oct. 7, 1969  G. W. MEEK  3,471,600
METHOD FOR CONTINUOUSLY FORMING CORRUGATED SHEETS
Filed July 14, 1967  4 Sheets-Sheet 2

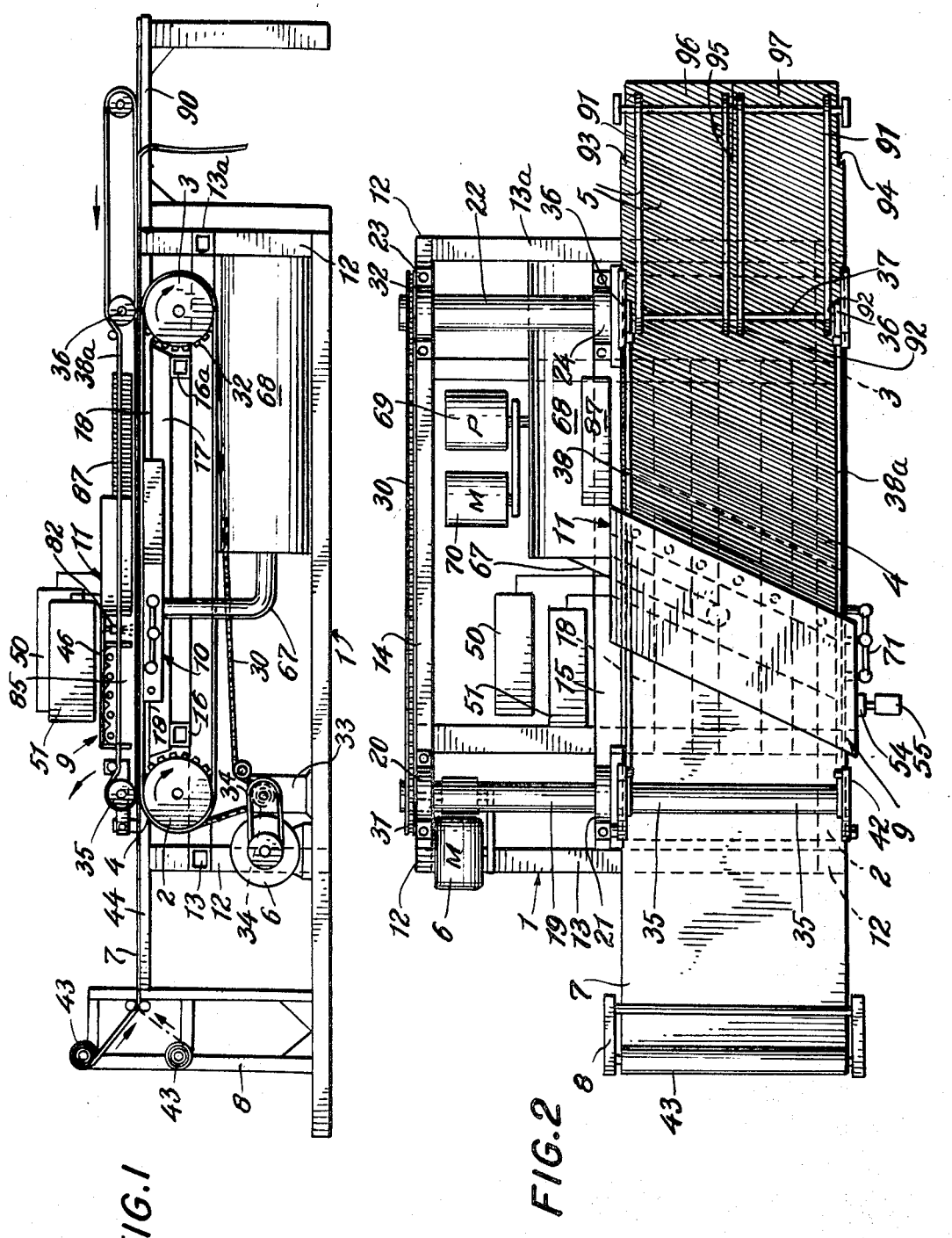

INVENTOR.
GEORGE W. MEEK
BY
ATTORNEY.

Oct. 7, 1969    G. W. MEEK    3,471,600
METHOD FOR CONTINUOUSLY FORMING CORRUGATED SHEETS
Filed July 14, 1967    4 Sheets-Sheet 3
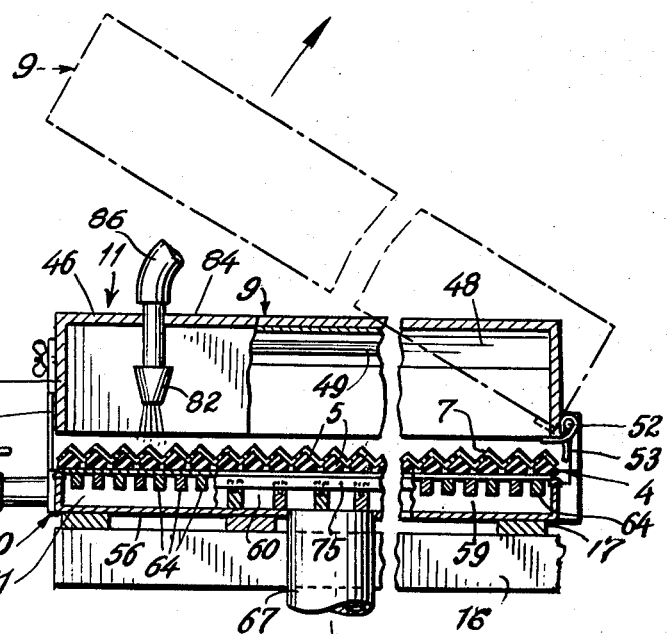
FIG. 5
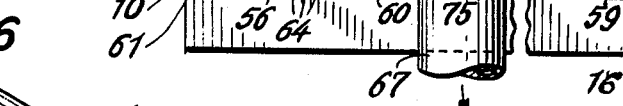
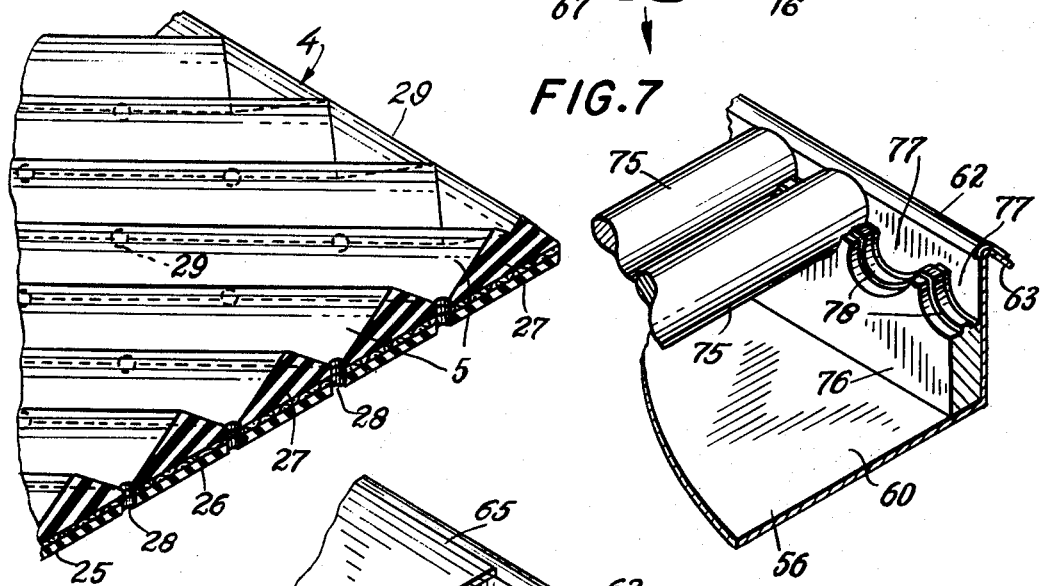
FIG. 6
FIG. 7
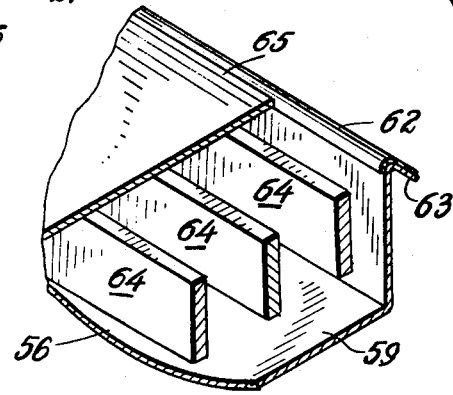
FIG. 8
INVENTOR.
GEORGE W. MEEK
BY
ATTORNEY.

Oct. 7, 1969   G. W. MEEK   3,471,600
METHOD FOR CONTINUOUSLY FORMING CORRUGATED SHEETS
Filed July 14, 1967   4 Sheets-Sheet 4
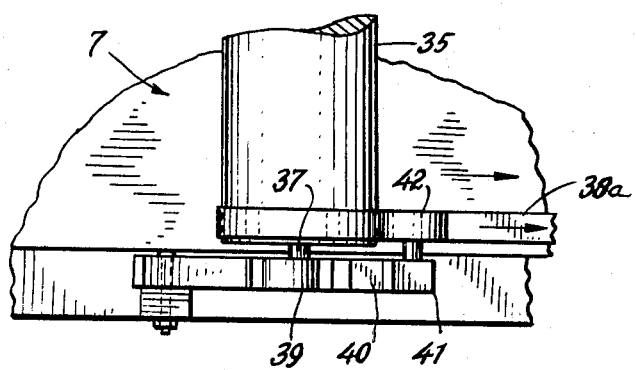
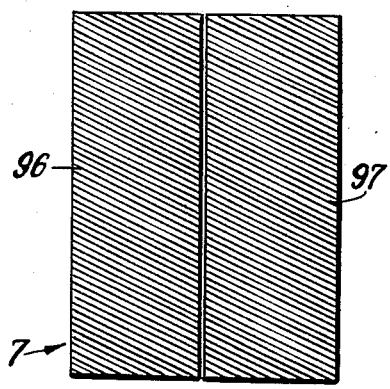
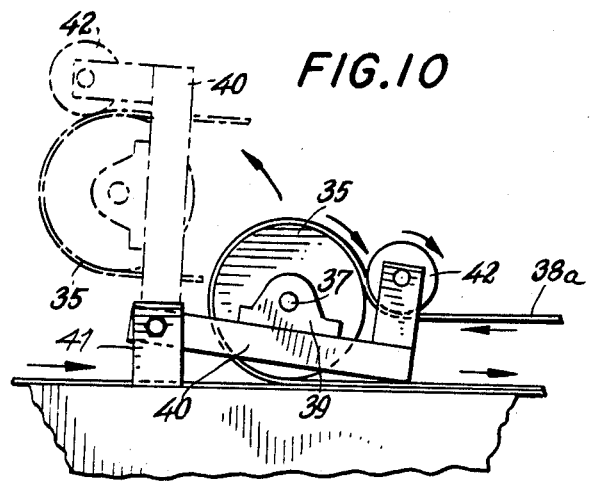
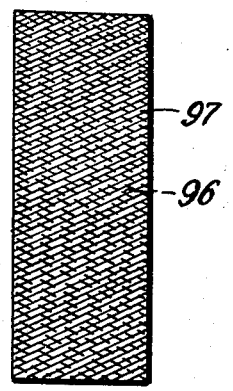
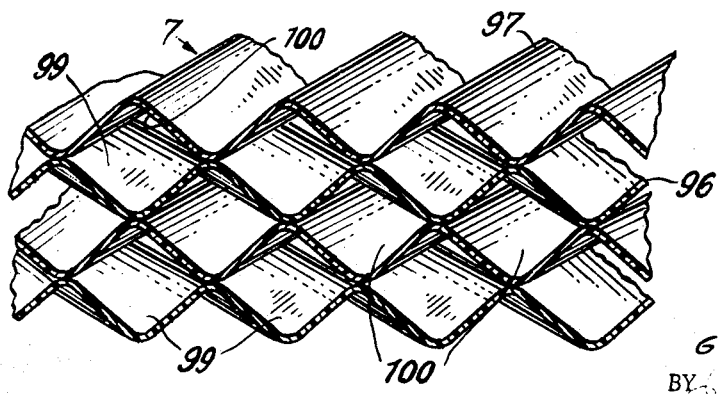
INVENTOR.
GEORGE W. MEEK
BY
ATTORNEY.

United States Patent Office 3,471,600
Patented Oct. 7, 1969

3,471,600
METHOD FOR CONTINUOUSLY FORMING CORRUGATED SHEETS
George W. Meek, Fort Myers, Fla., assignor to Munters & Co., Stocksund, Sweden, a company of Sweden
Continuation-in-part of application Ser. No. 420,353, Dec. 22, 1964. This application July 14, 1967, Ser. No. 657,461
Int. Cl. B29c 17/04, 25/00
U.S. Cl. 264—92                              3 Claims

ABSTRACT OF THE DISCLOSURE

A method for the forming of shaped articles from a planar sheet of thermoplastic material. In its more specific aspects, the method has particular utility in the forming of elongated corrugated sheets where in the corrugations are at an oblique angle relative to the longitudinal axis of the sheet, or, stated otherwise, to the direction of linear movement of the sheet. The forming of such angular corrugations presents special problems as to method and apparatus, which are overcome in the method and apparatus disclosed. In the method, an elongated, corrugated sheet is fed in the direction of its length in a continuous movement onto one side of a perforated, obliquely corrugated mold. The sheet and mold are moved in the direction of the length of the sheet through a series of zones comprising (a) a first zone wherein heat only is applied to the sheet, (b) a second zone wherein heat and pressure are simultaneously applied to the sheet, and (c) a third zone wherein a cooling fluid and pressure are applied to the sheet and mold to set the corrugations. These zones are substantially parallel to the corrugations of the mold so that distortion, internal stresses and warpage are avoided.

CROSS REFERENCE TO RELATED APPLICATION

This application is a continuation-in-part of my copending application Ser. No. 420,353, filed Dec. 22, 1964, for Method and Apparatus for Forming Shaped Articles, now abandoned.

BACKGROUND OF THE INVENTION

In the redesigning of cooling towers for air conditioning systems, there existed a substantial need for a more efficient tower fill that would provide a large surface area per unit of volume, a high heat transfer rate per unit of area, and which would be compact, lightweight and not subject to rot. It was found that stacked, obliquely corrugated sheets of a plastic material met these requirements, but it was difficult to economically and efficiently form these sheets by known methods and apparatus.

SUMMARY OF THE INVENTION

One of the objects of the present invention is to provide a method of forming shaped articles which utilizes a partial vacuum to deform a plastic sheet against a mold in the shape of the article to be formed.

Another object is to provide a method of forming shaped articles which deforms the sheet to a desired shape while it is heated and cools the sheet while held in the desired shape by the partial vacuum.

Another object is to provide a method of forming shaped articles in which the rate of travel of the sheet and rate of heating during its travel are coordinated to soften the sheet to the required plasticity before it is deformed.

Another object is to provide a method of forming shaped articles from a sheet of thermoplastic material which gradually deforms the sheet to produce a more uniform elongation of the material of the sheet.

Still another object of the invention is to provide an improved method for forming corrugations in a linearly moving sheet of thermoplastic material, wherein the corrugations are at an angle to the direction of linear movement of the sheet, without producing distortions in the sheet which will lead to warping of the finished product.

Another object is to provide a method of forming corrugated sheets of a plastic material for use in cooling towers to provide a compact, lightweight fill for producing a large surface area per unit of volume with a high heat transfer rate per unit of area.

These and other objects will become more apparent from the following description and drawing in which like reference characters denote like parts throughout the several views. It is to be expressly understood, however, that the drawings are for the purpose of illustration only and are not a definition of the limits of the invention, reference being had for this purpose to the appended claims.

DESCRIPTION OF THE DRAWINGS

FIGURE 1 is a side elevational view of a machine for carrying out the steps of the method and showing a sheet of thermoplastic material being fed along the top of a continuous belt having an embossed surface constituting a mold on which the sheet is deformed.

FIGURE 2 is a plan view of the machine illustrated in FIGURE 1 and showing how the plastic sheet is deformed to produce corrugations therein extending at an angle to its direction of movement.

FIGURE 5 is a transverse sectional view taken on line 5—5 of FIGURE 3 to show the relation of the suction head to the perforated forming belt and showing the three steps of heating, deforming and cooling the deformed belt.

FIGURE 6 is a perspective view of the forming belt, partly in section, to show the corrugations and perforations therein.

FIGURE 7 is a detailed view to illustrate the antifriction rollers in the suction head and the supporting bearing blocks therefor.

FIGURE 8 is a detailed view of a portion of the preforming section of the suction head and showing the spaced rails for supporting the moving belt with a minimum of friction and the sealing bead at the flanged edge thereof.

FIGURE 9 is an enlarged detailed view of one of the feed rollers and belt for feeding a sheet onto the forming belt.

FIGURE 10 is a side elevational view of the feed roll and belt illustrated in FIGURE 9 and showing the manner in which it may be rocked to an upright position to initially feed a sheet on the belt.

FIGURE 11 is a plan view of a corrugated sheet formed on the machine and split at the middle to form two separate strips.

FIGURE 12 illustrates two of the strips cut from the continuous sheet and folded one over the other so that the angular engagement of the corrugations hold the sheets spaced from each other.

FIGURE 13 is an end view of the superimposed sheets showing the angular relationship of the interconnected passageways between adjacent sheets.

DESCRIPTION OF THE PREFERRED EMBODIMENTS

Figure 3:
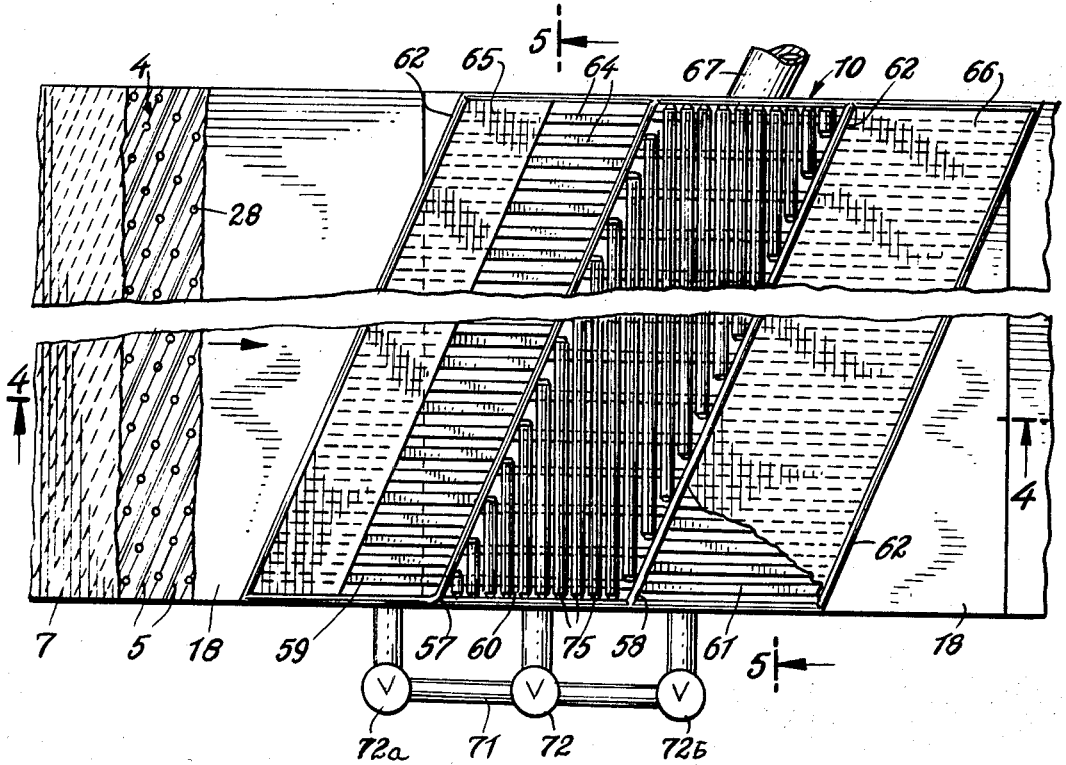
FIGURE 3 is an enlarged plan view showing a suction head underlying the perforated belt for deforming the sheet and the antifriction means for supporting the belt as it moves across the head.

The method of the present invention in its broadest aspect comprises the steps of feeding a sheet of thermoplastic material onto the face of a perforated mold having a shape corresponding to the shape of the article to be formed. The sheet and mold are moved continuously through successive zones at a substantially constant rate of speed. The sheet is heated only during its movement through a first zone to make it softer; subjected, in a second zone, to heat and to a partial vacuum, acting through the perforated mold to draw the softened sheet against its surface during its movement through said zone; and subjected in a third zone to a cooling fluid and vacuum to harden the sheet in its deformed shape. The deforming zone overlaps the individual heating and cooling zones to deform the sheet while it is being heated and harden the sheet while held in its deformed shape. The formed sheet is then stripped from the mold and each formed article cut from the sheet.

The method may be performed with any theromplastic material which may be softened at relatively low temperatures in the range of 180° to 500° F. and deformed at moderate differences in pressure in the range of one to twelve pounds per square inch. Such thermoplastic materials include among others polyethylene, polystyrene, polyamine, polyvinyl chloride, polycarbonate, by way of example, but not excluding other thermoplastic materials which can be molded in accordance with the present method. The sheets may be of any thickness which can be softened during the time it moves through the heater and deformed at a differential in pressure within the range of a partial vacuum. Sheets as thin as .001 and as thick as .125 inch have been molded by the method of the present invention. However, the method of the present invention is particularly adapted for use with thin sheets in a range of thickness between .0025 and .007 inch.

The method may be used to make articles of most any shape that do not have re-entrant walls so that the formed sheet may be stripped from the mold. For example, the method may be used in making decorative panels having various surface designs for use as covers, luminous ceiling panels, acoustical tile, ornamental pieces and for many other applications. For this purpose, the sheets may be transparent, translucent, opaque and/or colored.

The speed or rate of movement of the mold and sheet thereon is a function of the thickness of the sheet, the kind of material being molded and the shape of the article to be formed so as to soften the sheet to the required plasticity during its movement through the heating zone. If a thick sheet of material is to be formed over a mold requiring a considerable elongation of the sheet then the sheet must remain in the heating zone for a longer period than a thinner sheet requiring a minimum elongation. For this purpose, the rate of heating and the rate of movement of the sheet are coordinated to produce the required deformation at the maximum rate of speed. It has been found that the sheet material may be elongated within the range of 30 to 60%, but the greater the amount of elongation of the material a gerater thickness of the original sheet is required.

The mold is perforated in accordance with the particular shape of the article to be formed so as to apply a suction uniformly on the sheet to draw it against the surface of the mold. The partial vacuum is applied on the opposite side of the mold from that contacted by the sheet and acts directly through the mold to draw the sheet against its surface. Preferably, the vacuum is applied to the mold in successive steps at increasing pressure differentials to first preform the sheet at a lower pressure and thereafter complete the formation of the sheet at a higher pressure. For example, the first step of deformation may be performed at a pressure difference of from three to four pounds per square inch while the final forming step is performed at a difference of pressure of from seven to eight pounds per square inch. Such deformation in successive steps increases the period of time during which deformation occurs so that the sheet will not tend to thin out too rapidly in limited areas, but instead, will produce a more uniform elongation over the entire area by flow of the material from one area to another.

After the sheet has been deformed, the deformed sheet is cooled to harden it in its deformed shape. Any suitable cooling means may be provided, but preferably the sheet is first cooled rapidly by spraying it with water and the cooling thereafter continued by directing a stream of atmospheric air across the surface of the sheet. Thus, both the water and air remove heat from the sheet by sensible heat transfer, and also remove heat from the sheet by evaporative cooling which further increases the cooling effect.

After the sheet has been deformed, molded onto the surface of the mold and hardened in its deformed shape, it is stripped from the mold by moving it in a path separate from the path of the mold. During such movement the formed articles may be cut from the sheet to separate them from the sheet.

As stated above, the method may be used to mold articles of any desired shape from a planar sheet of thermoplastic material. However, the method is particularly adapted for the manufacture of corrugated sheets for use as a packing fill in cooling towers of the type described and claimed in U.S. Letters Patent Nos. 2,809,817 and 2,809,818, issued to C. G. Munters on Oct. 15, 1957. In accordance with the present invention, the corrugations extend transversely of the sheet at an acute angle to the direction of its movement. Such corrugated sheets for a cooling tower fill are preferably made of polyvinyl chloride which is particularly desirable because it is resistant to burning, is not attacked by acids or alkali, and has been found to have a high coefficient of heat transfer per unit of volume. The corrugations are made in sheets from .0025 to .005 inch in thickness while moving at a rate of speed varying from five to twenty feet per minute. Sheets .005 inch in thickness have been formed with corrugations 0.50 inch deep while moving at a rate of speed of ten feet per minute, but sheets .0025 inch thick have been formed at speeds of twenty feet per minute while making corrugations 0.25 inch deep. A sheet of such polyvinyl chloride when corrugated in accordance with the method of the present invention may be split longitudinally into separate strips, the pair of strips folded over each other in a stack so that the corrugations in adjacent sheets extend at an angle to each other to hold the sheets spaced and the contacting portions or the corrugations adhesively attached to each other to form a reinforcing fill. As stated above, the method of the present invention may be used for making articles of many different shapes and forms, but for purposes of description the method and machine will hereinafter be directed to the embodiment illustrated for making corrugated sheets for cooling tower fill.

In forming continuous sheets of the fill material, a substantial problem arose as to the shaping of corrugations oblique to the direction of travel of the sheet. It was found that by forming the zones at an oblique angle substantially parallel to the corrugations, warpage of the filler material could be substantially reduced or eliminated. The heat and cooling fluid, applied as noted, avoided the operation upon one portion of a corrugation before the remaining portion was affected. Internal stresses and warpage in the finished and shaped article were found to be thereby avoided.

Referring now to the drawings, a preferred form of machine is illustrated for practicing the method of the present invention. The machine comprises a frame 1 having spaced pulleys 2 and 3 adjacent opposite ends and on which a continuous belt 4 is mounted. The outside face of belt 14 is embossed to form a mold of continuously repeating patterns of the article to be formed and perforated to exhaust air from said embossed surface. In the illustrated embodiment the continuously repeating patterns are in the form of corrugations 5, see FIGURES 5 and 6, extending transversely of the direction of movement of the belt 4 and at an acute angle thereof of, for example, 60°. The pulleys 2 and 3 and forming belt 4 thereon are driven at a substantially constant rate of speed by a motor 6 and a continuous sheet 7 of thermoplastic material is fed onto the top of the forming belt from a roll of the material mounted on rack 8 at one end of the machine. The machine has a heater 9 overlying the forming belt so as to form two zones. In the first zone, heat only is applied to the strip. In a second zone, a suction head 10 underlies the perforated belt, and both heat and suction are applied to deform the sheet by drawing it against the forming belt surface. A cooler 11 overlies the belt, immediately adjacent the heater, and the suction head and a cooling fluid hardens and sets the deformed sheet. The deformed sheet is then stripped from the forming belt 4, the edges of the deformed sheet are trimmed, and the formed articles cut from the sheet.

The frame 1 of the machine, see FIGURES 1 and 2, comprises an open rectangular base supported on the floor, upright corner posts 12, end beams 13 and 13a connecting the corner post at opposite ends of the machine, a longitudinal beam 14 connecting the corner posts at one side of the machine, and a longitudinal beam 15 extending between the end beams 13 and 13a midway between the front and back of the machine. Thus, the frame has an open front with spaced parallel beams 14 and 15 at the rear of the open front. Extending transversely of the longitudinal beam 14 and 15 are cantilever beams 16 and 16a which extend forwardly onto the open front of the machine between the pulleys 2 and 3. The transverse beams 16 and 16a support longitudinally extending ribs 17 which, in turn, support deck plates 18 and the suction head 10 therebetween which together provide a horizontal support for the upper course of the forming belt 4.

Pulley 2 is mounted on the overhanging end of a shaft 19 journaled in spaced bearings 20 and 21 on the longitudinal beams 14 and 15, and pulley 3 is mounted on the overhanging end of a shaft 22 journaled in bearings 23 and 24 mounted on the longitudinal beams. Thus, the pulleys 2 and 3 and ends of the shafts 19 and 22 project into the open end of the frame 1 from the beam 15.

The perforated belt 4 may be of any suitable construction and composed of any suitable materials which will give the flexibility, resiliency and wearing properties required. One construction shown in detail in FIGURE 6 comprises an inside or backing layer 25 of a cloth reinforced vinyl plastic, an intermediate layer 26 of a flexible but non-stretching material, such as a fabric of fiberglass strands and an outside or surface layer 27 in which the mold pattern is embossed of a flexible material which will retain the shape of the article to be formed, such as silicone rubber. The inside and outside layers 25 and 27 may be bonded to the intermediate layer of fiberglass fabric by means of an adhesive or the silicone rubber. Also, the pattern of the mold may be formed by molding the silicone rubber of the outside layer on a die or the pattern may be cut from the surface of the material. With a belt 4 having a pattern of repeated corrugating ribs 5 extending transversely at an angle to the side of the belt as illustrated in FIGURE 6 for making corrugated sheets, the perforations are in the form of spaced holes 28 in the valleys between the ribs which extend through all three layers 25, 26 and 27 of the forming belt. In addition to the ribs 5 extending at an angle transversely of the belt, a longitudinal sealing rib 29 is provided at each side of the belt and of the same height as the corrugating ribs and into which the latter merge.

The pulleys 2 and 3 are driven synchronously by a chain 30 meshing with sprockets 31 and 32 on the rearward ends of the shafts 19 and 22. Chain 30, in turn, is driven from the motor 6 through a speed reducing gear box 33 having a pinion sprocket 34 in driving engagement with the chain.

Overlying pulleys 2 and 3 are cooperating feed rolls 35 and 36, respectively. Roll 35 overlying pulley 2 is a pinch roll of substantially the same diameter throughout its entire length corresponding to the width of the sheet 7, and the rolls 36 overlying pulley 3 are in the form of pulleys adjacent the ends of a transverse shaft 37. Narrow belts 38 and 38a extend around the outer ends of the pinch roll 35 and pulleys 36 adjacent the sides of the belt 4 which overlie the side edges of the sheet 7 and longitudinal sealing ribs 29 on the forming belt 4 and hold the sheet against the belt. Each end of the pinch roll 35 and shaft 37 for pulleys 36 is journaled in a bearing 39, see FIGURES 9 and 10, intermediate the ends of an arm 40 pivotally connected at one end to a stanchion 41. A tensioning roller 42 is mounted on the other end of the pivoted arm 40 for engaging the narrow belt 38a to hold it tightly wrapped around the pinch roll 35 and pulleys 36, respectively. As shown in FIGURE 10, the arm 40 may be swung upwardly away from the belt 4 to feed the sheet 7 from a supply roll 43 across the bridge 44 and between the pulley 2 and pinch roll 35. During such movement the narrow belt 37 would be disconnected to permit such movement.

Rack 8 may mount several rolls of the thermoplastic sheet material 7 so that any one of a plurality of rolls of sheet material may be mounted on the rack and feed onto belt 4. Thus, when one roll 43 of a sheet 7 becomes exhausted, or a sheet of a different kind or thickness is to be used, the pinch roll 35 is swung up to the position illustrated in dot-dash lines in FIGURE 10 and the sheet fed between it and pulley 2 until it covers the suction head 10. After the sheet 7 has been started, it will be advanced by the narrow belts 38 and belt 4 at a substantially constant rate of speed as controlled by the motor 6 and speed reduction gear box 33. During such movement the narrow belts 38 will hold the edges of the sheet 7 in sealing engagement with the longitudinal ribs 29 on the forming belt 4.

The heater 9 is in the form of a hood extending transversely across the belt 4 and having a top wall 46 and depending marginal wall 47 with its lower edge slightly spaced from the sheet 7. The heating hood 9 is of a width to cover a substantial length of the sheet 7 as it passes thereunder. As illustrated most clearly in FIGURE 2, the hood in the illustrated embodiment extends at an angle to the direction of movement of the belt 4 corresponding to hte inclination of the corrugations 5 on the forming belt 4. As shown in FIGURE 1, the heater 9 has a series of arcuate reflectors 48 at the top thereof with an electric heating element 49 in each reflector. The electric heating elements 49 may be of any suitable type, such as resistance rods which produce heat in accordance with the rate of current flow. As shown in FIGURE 2, a plurality of rheostats 50 and 51 are provided which may be adjusted to vary the current flow through the heating elements. Thus, the rate of heating may be adjusted by the rheostats 50 and 51 and the rate of travel of the thermoplastic sheet may be adjusted through the speed reducing gear box 33 to heat the thermoplastic sheet to the required degree of softness during its movement across the suction head 10.

As shown in FIGURE 5, the heating hood 9 is pivotally mounted at its rearward edge on a hinge 52 and yieldingly biased to a raised position illustrated in dash lines in FIGURE 5 by a spring 53. The heating hood 9 is latched in its lowered position by means of a latch arm 54 engaged by a latching element 55, see FIGURE 2. The latching element 55 may be of any suitable construction, such as an electromagnet having an armature operated in response to an excessive temperature in the heating hood, or by the belt 4 stopping, or a combination of these functions to release the latching arm and permit the hood to swing upwardly.

Figure 4:
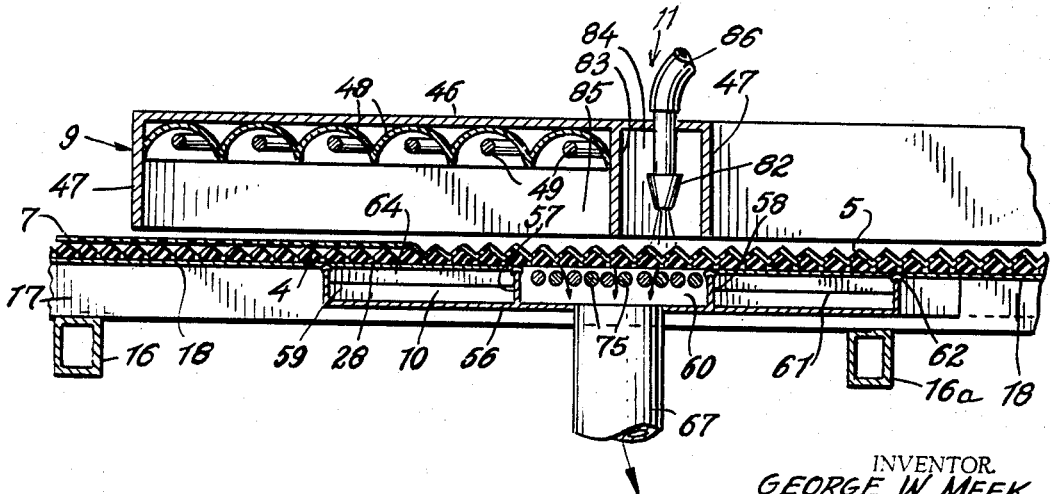
FIGURE 4 is a sectional view taken on line 4—4 of FIGURE 3 to show the overlapping arrangement of the vacuum head with the heater and cooling means.

The suction head 10 is shown most clearly in FIGURES 3 and 4 as comprising a suction pan 56 supported on the ribs 17 and cantilever beams 16 and 16a of the frame 1. The pan 56 extends across the machine at an angle corresponding to the angular relation of the corrugations 5 and heating hood 9 and is divided by transverse walls 57 and 58 to form separate chambers 59, 60 and 61. The chamber 59 constitutes a preforming zone, the chamber 60 the main forming zone, and the chamber 61 an after holding zone. Covering the top edges of the marginal edges of the chambers 59, 60 and 61 is a continuous bead 62 of an antifriction material such as "Teflon." As shown in detail in FIGURE 7, the marginal edges of the pan 56 and transverse walls 57 and 58 are formed with folded over flanges 63 on which the antifriction material is applied to form the bead 62. Spaced ribs 64 extend longitudinally of the preforming chamber 59 for supporting the belt 4 thereon as it moves across the open top thereof, and the area of the open top of the chamber is controlled by a plate 65 extending across substantially one-half the area of the chamber. In some operations, the area of the preforming chamber 59 should be enlarged by using a narrow plate 65, and in other operations it should be narrowed by using a wider plate. The same apply to the chamber 61, which in the illustrated embodiment is shown entirely closed by a plate 66 as the forming of corrugations in a thin sheet 7 does not require after-holding for any substantial period of time. The plate 66 also reduces the friction on the bottom of the belt 4 as it passes over chamber 61. It will be understood, however, that for other forms of article, a part or the whole area of the chamber 61 may be open.

A partial vacuum is produced in the central chamber 60 of the pan 56 where the main forming operation is performed, see FIGURE 2, by means of an exhaust pipe 67 connecting the center of the chamber to a vacuum tank 68. Vacuum tank 68 acts as a reservoir to maintain a substantially constant pressure in the chamber with variations in the load and is continually evacuated by means of a suction pump 69 driven by an electric motor 70. The three chambers 59, 60 and 61 are connected to each other through a manifold 71 having a branch connected to each chamber with throttling valve 72 in each branch for controlling the absolute pressure in each of the chambers. For example, the illustrated embodiment of the machine may be operated successfully to form corrugated sheets with an absolute pressure of seven to eight pounds per square inch in the main forming chamber 60, and an absolute pressure of twelve pounds per square inch in the preforming chamber 59. This difference in pressure is maintained by adjusting the throttling valves 72 and 72a. In the illustrated embodiment the throttling valve 72b is completely closed.

As stated above, the forming belt 4 is supported by the ribs 64 in the preforming chamber 59 and bears against the bead 62 at the edges of the vacuum pan 56 to reduce the friction while maintaining a seal. In addition, rollers 75 are provided in the main deforming chamber 60 to support the forming belt 4 while permitting relative movement with a minimum of friction. As shown in detail in FIGURES 3 and 7, the rollers 75 are supported in rectangular bearing blocks 76 having semi-circular recesses 77 in the upper edge thereof. The bearing blocks 76 extend longitudinally of the direction in which the belt 4 moves and are arranged in spaced relation across the chamber 60 of the suction head 10. The rollers 75 are of different lengths and set in the recesses 77 in the bearing blocks 76 and each recess is provided with a bearing insert 78 of an anti-friction material such as Teflon to reduce friction to a minimum. Thus, the forming belt 4 rolls across the suction head 10 with a minimum of resistance while it is sealed at the edges of the pan to maintain the absolute pressure required.

The heating hood 9, in addition to mounting heating elements 49, mounts spray heads 82 for spraying water on the top of the sheet to cool and reharden the deformed sheet. To this end, a wall 83 is provided between the heating elements 49 and the marginal wall 47 at the forward end of the hood to form an open sided spray chamber 84 overlying the sheet adjacent the heating chamber 85. A series of the spray heads 82 are mounted in the top wall 46 of the hood 9 and are supplied with water through a flexible hose connection 86. In addition to cooling the sheet 7 by water, a blower 87 is provided at the rearward side of the belt 4 for directing a stream of atmospheric air across the surface of the deformed sheet 7. As shown in FIGURES 1 and 2, the air blower 87 is located just forwardly of the water cooling spray chamber 84 in the hood 9.

As will be observed by reference to FIGURE 4, the main forming chamber 60 of the suction head 10 is so located as to overlap the heating chamber 85 so as to apply suction through the forming belt 4 while the sheet 7 is still being heated and also overlap the spray chamber 84 containing the spray heads 58. Thus, the sheet 7 is deformed in successive steps at progressively higher pressure differentials while it is being heated and is initially cooled to harden the deformed sheet while still maintained in deformed condition by the suction head 10.

As the forming belt 4 moves around the pulley 3 at the end of the machine, the deformed sheet 7 feeds onto a table 90 at the same level as the upper course of the belt which strips the sheet from the belt. Spaced belts 91 driven from pulleys 92 on the pulley shaft 37 advance the deformed sheet 7 along the table 90 relative to knives 93 and 94 for trimming the edges of the sheet. A centrally located knife 95 splits the deformed sheet 7 into separate strips 96 and 97, as shown in FIGURE 11. The split strips 96 and 97 may then be folded one over the other so that the corrugations hold them in spaced relation, as shown in FIGURES 12 and 13, and the engaging apices of the corrugations of adjacent sheets may be joined by an adhesive to build up a connected stack of the corrugated sheets of the desired height. One form of the machine having now been described in detail, the mode of operation is next explained.

To initiate operation of the machine, the end of a sheet 7 is drawn from a supply roll 43 of the material on the rack 8 and fed between the narrow belts 38 and forming belt 4. Operation of the suction pump 69 is initiated to reduce the pressure in the vacuum tank 68 while the latter is shut off from the suction head 10 by a valve (not shown) and the electric heating elements 49 in the heater 9 are connected to a source of current to initiate heating. After the heater 9 and vacuum pump 69 have been operated for a sufficient period of time to maintain a stable operating condition, a sheet forming operation is initiated by starting the driving motor 6. Motor 6 drives the chain 30 to rotate the pulleys 2 and 3 synchronously and thereby initiates horizontal movement of the upper course of the forming belt 4 mounted thereon. Rotation of the pulley 2 acting through the sheet 7 drives the narrow belts 38 and pinch roll 35 to advance the thin sheet 7 with the forming belt 4.

As the sheet 7 passes under the hood of the heater 9, it is heated sufficiently to soften the thermoplastic material of the sheet. After the forward edge of the sheet 7 passes the suction head 10 so that a section of the sheet completely covers the head, the suction tank 68 is connected to the main chamber 60 of the suction head. Evacuation of the chamber 60 immediately draws the forming belt against the bead 62 at the upper edges of the suction head to seal the joints therebetween so that all flow of air into the vacuum chamber 60 must occur through the perforations 28 in the forming belt 4. Evacuation of air from the space between the forming belt and softened sheet 7 draws the latter against the inclined surfaces of the corrugating ribs 5 formed in the surface of the belt until the sheet tightly conforms to the shape of the ribs.

To this end, the side edges of the sheet 7 are held against the longitudinally extending ribs 29 at the sides of the forming belt 4 by the narrow belts 38 which, together with atmospheric pressure acting on the top of the sheet, seals the joints between the sheet and forming belt.

If the sheet 7 is not forming properly, or the material of the sheet is stretching excessively in localized areas or is not stretching sufficiently to conform to the mold, the rheostats 50 and 51 and/or speed reduction gear 33 may be adjusted to vary the rate of heating and speed of movement of the belt and sheet. By adjusting the rheostats 50 and 51 the rate of heating by the electric heating elements 49 is varied to increase or decrease the degree of softening of the sheet 7. By adjusting the variable speed reduction gearing 33, the rate of travel of the sheet 7 may be adjusted, and therefore the period of time during which the sheet is subjected to heating by the heater 9. It is, of course, desirable to operate the forming belt 4 and sheet 7 at the maximum rate of speed at which the sheet will be properly formed during its movement across the suction head 10. The deformation of the planar sheet 7 to a corrugated sheet requires a stretching or extension of the material of the sheet, and an overall elongation of the sheet material of from 30% to 40% is permissible. However, if the elongation of one portion of the sheet is excessive, because of its being deformed too rapidly, the sheet may actually rupture. It is therefore desirable, especially with extremely thin sheets, to slow the deformation of the sheet 7 for an appreciable period of time. This is accomplished by preforming the sheet as it passes over the chamber 59 of the suction head 10, see FIGURES 3 and 4, at a low pressure differential of, for example, four to five pounds per square inch, and then complete the forming as the sheet passes over the main forming chamber 60 at a higher difference in pressure of, for example, seven to eight pounds per square inch. To this end, the valves 72 and 72a are adjusted to produce the required difference in absolute pressure in the adjacent chambers 59 and 60, which pressure is maintained by the engagement of the forming belt 4 with the bead 62 on the transverse wall 57 between the chambers. Thus, by adjusting the absolute pressure to which the suction head 10 is subjected and the relative absolute pressures in the chambers 59 and 60, it is possible to control the forming of the sheet 7 at a rate which will permit uniform stretching or elongation of the material of the sheet.

The sheet 7 is deformed by the action of the suction head 10, both in the preforming and final forming states, while it is being heated by the heater 9. After the sheet 7 has been completely formed, it is immediately cooled to harden it in its deformed condition by spraying the surface with water from the spray heads 82, see FIGURE 4, in the spray chamber 84 at the forward end of the heating hood 9. During the water cooling operation the deformed sheet 7 is held against the corrugations 5 in the forming belt 4 by the suction head 10 to maintain the shape of the deformed sheet as it rehardens. In addition to spraying the surface of the deformed sheet 7 with water from the spray heads 82, the sheet is further cooled by the blower 87 which directs a stream of atmospheric air across the surface of the sheet. Such an arrangement augments the transfer of heat from the deformed sheet by evaporative cooling.

Atmospheric pressure acts on the top of the forming belt 4 and sheet 7 during their movement across the suction head 10 which presses the belt against the supporting surface overlying the head. To reduce the friction resulting from such force and reduce the strain on the forming belt to move it across the suction head, the antifriction ribs 64 in the chamber 59 and antifriction rollers 75 in the main forming chamber 60 reduce the friction and resistance to movement of the forming belt to a minimum. In other words, the forming belt 4 merely slides along the top of the spaced ribs 64 and rolls across the chamber 60 on the bearing rollers 75.

The deformed sheet 7 is directed across the horizontal table 90 at the end of the machine as the forming belt 4 passes around the pulley 3 to strip the formed sheet from the belt. The flat edges at opposite sides of the sheet 7 are trimmed from the remainder of the sheet by the stationary knives 93 and 94, see FIGURE 2, and the sheet is split centrally to form two separate strips 96 and 97, see FIGURE 11. Lengths of the strips 96 and 97 are then cut from the sheet to form separate panels which may be folded one over the other as shown in FIGURE 12. The crossing corrugations on adjacent strips 96 and 97 then hold the strips spaced, as shown in FIGURE 13, to provide a series of flutes 99 and 100 between each pair of adjacent sheets extending at an angle to each other. A self-contained package of said sheets may be formed by stacking sheets one over the other in the manner illustrated in FIGURE 12 and adhesively joining the sheets at the places where the corrugations across each other. Such a package can then be inserted as a unit in a cooling tower to provide a cooling tower fill.

The cantilever mounting of the pulleys 2 and 3 which overlie the open front of the machine facilitates the mounting of the forming belt 4 on the machine and the removal of the belt therefrom. For this purpose, a movable table is provided having a shape corresponding to the shape of the spaced pulleys 2 and 3 and deck plates 18 and at the same height as the pulleys and deck plates. The relatively heavy forming belt 4 may then be mounted on the table and slid laterally onto the pulleys, or may be slid laterally from the pulleys onto the table.

It will now be observed that the present invention provides a method of and machine for forming shaped articles by utilizing a partial vacuum to deform a sheet while it is being heated and cooling the sheet while it is held in the deformed shape by said partial vacuum. It will also be observed that the rate of travel and rate of heating are coordinated to soften the sheet to the desired plasticity before it is deformed. It will also be observed that the present invention provides for gradually deforming the sheet to produce a more uniform elongation of the material of the sheet. It will further be observed that the present invention provides for forming corrugated sheets of plastic material for use in cooling towers to provide a compact, lightweight fill. It will further be observed that the present invention provides an improved machine for forming shaped articles in which the mold is in the form of a continuously perforated belt having successive patterns of the article to be formed embossed on its surface, adjacent heating and cooling elements at one side of the belt and a suction head at the other side of the belt which overlaps both the heating and cooling element. It will further be observed that the present invention provides a machine which reduces the friction on the forming belt to a minimum as it continuously moves through the machine and a construction which facilitates the mounting and removal of the forming belt to and from the machine. It will still further be observed that the present invention provides a machine which is of relatively simple construction and one which is reliable in operation to form plastic articles from a continuous sheet of thermoplastic material at relatively high rates of speed.

What is claimed is:

1. A method of continuously forming an elongated corrugated sheet of thermoplastic material having its corrugations extending at an oblique angle to the side edges of the sheet, comprising the steps of:

feeding an elongated, planar sheet of thermoplastic material in the direction of its length in a continuous movement onto one side of an obliquely corrugated mold shaped according to the corrugations to be formed;

moving the sheet and mold in the direction of the length of said sheet through a series of zones, said zones comprising (a) a first zone wherein heat only is applied to said sheet to soften said thermoplastic material, (b) a second zone wherein heat and pressure are simultaneously applied to said softened sheet, forcing said sheet tightly against said mold, and (c) a third zone wherein a cooling fluid and pressure are simultaneously applied to said sheet to harden said thermoplastic material and to set said corrugations;

each of said zones being successive and adjacent, and substantially parallel to the corrugations formed in said sheet, whereby said corrugations as formed are cooled and set without distortion or warpage; and stripping the elongated, obliquely corrugated sheet from the mold during movement in the direction of the length of said sheet.

2. A method as set forth in claim 1, wherein said second zone has separate, successive and increasing pressures.

3. A method as set forth in claim 1, wherein the cooling fluid of said third zone comprises first an evaporative liquid, and secondly a gas, applied successively and separately.

References Cited

UNITED STATES PATENTS

| | | |
|---|---|---|
| Re. 23,910 | 12/1954 | Smith et al. |
| 690,713 | 1/1902 | Ferres. |
| 2,042,243 | 5/1936 | Watson. |
| 2,418,974 | 4/1947 | Henry _____ 18—10 XR |
| 2,526,318 | 10/1950 | Battin _____ 18—10 XR |
| 2,776,452 | 1/1957 | Chavannes _____ 18—10 |
| 2,836,852 | 6/1958 | Butzko. |
| 3,077,000 | 2/1963 | Huisman et al. |
| 3,105,270 | 10/1963 | Fibish. |
| 3,126,580 | 3/1964 | Paschke _____ 18—10 |
| 3,170,192 | 2/1965 | Oesterheld. |
| 2,193,052 | 3/1940 | Atwater _____ 264—88 X |
| 2,493,439 | 1/1950 | Braund _____ 264—92 |
| 3,084,389 | 4/1963 | Doyle _____ 264—92 |
| 3,226,457 | 12/1965 | Smith _____ 264—90 |
| 3,231,647 | 1/1966 | Oesterheld _____ 264—90 |

ROBERT F. WHITE, Primary Examiner

J. H. SILBAUGH, Assistant Examiner

U.S. Cl. X.R.

18—10, 19; 264—237, 286